July 3, 1923. 1,460,764
H. NIELSEN ET AL
STUFFING BOX FOR ROTARY DRIERS, KILNS, CALCINING FURNACES, RETORTS, OR THE LIKE
Filed Dec. 8, 1922
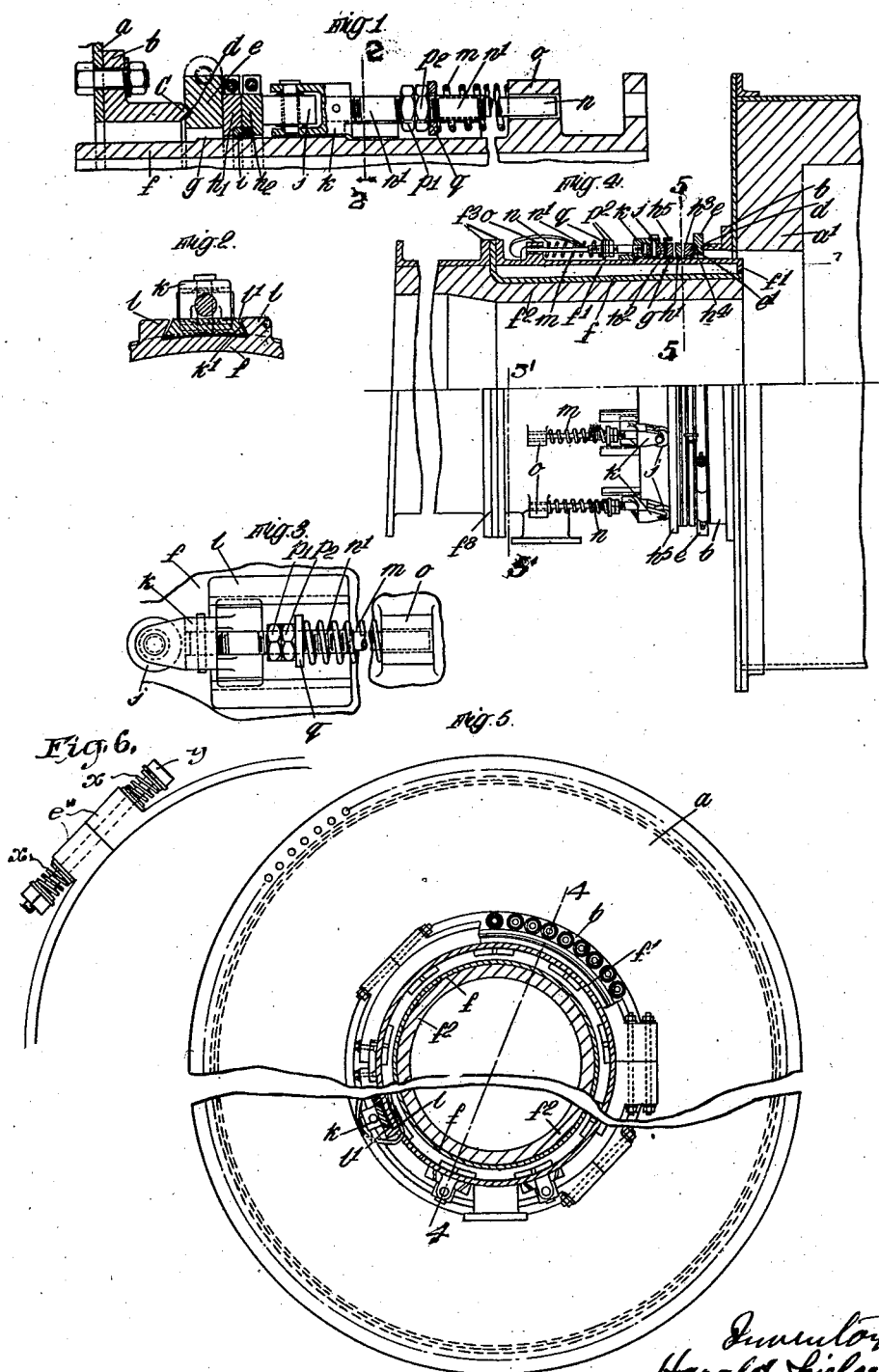

Patented July 3, 1923.

1,460,764

UNITED STATES PATENT OFFICE.

HARALD NIELSEN, OF LONDON, AND BRYAN LAING, OF HATFIELD, ENGLAND.

STUFFING BOX FOR ROTARY DRIERS, KILNS, CALCINING FURNACES, RETORTS, OR THE LIKE.

Application filed December 8, 1922. Serial No. 605,725.

*To all whom it may concern:*

Be it known that we, HARALD NIELSEN, a subject of the King of Denmark, and BRYAN LAING, a subject of the King of Great Britain, residing, respectively, at 13 Firs Avenue, Muswell Hill, London, in the county of Middlesex, England, and Abdale House, Hatfield, in the county of Herts, England, have invented certain new and useful Improvements in or Relating to Stuffing Boxes for Rotary Driers, Kilns, Calcining Furnaces, Retorts, or the like, of which the following is a specification.

This invention relates to joints for rotary driers, kilns, calcining furnaces, retorts or the like, and more particularly, to rotary retorts for the distillation or heat treatment of carbonaceous or like materials of the kind in which the material undergoing treatment is subjected to the influence of heating gases, such as combustion gas, producer gas, water gas or the like, which gases are admitted to the interior of the revolving retort through a stationary gas pipe.

As is well understood it is extremely difficult in such retorts to secure gas tightness with stuffing boxes of large diameter as the stuffing boxes are subjected to high temperatures, so that circumferential and longitudinal expansion of the inlet and outlet tubes, as also of the retort through which the gases are being conducted, as well as eccentric movements due to uneven longitudinal expansion of the retort lengthwise and crosswise during working under heat takes place. It is of great importance that gas tightness should be secured in such cases as, if the stuffing box permits communication with the atmosphere, the gases passing to or from the retort will be objectionably diluted, or, in other cases may cause an explosion. At the same time it has not been feasible to secure gas tightness by employing a pliable organic substance or a mineral substance such as asbestos, as, on account of the high temperatures prevailing in such retorts, charring of the organic material quickly takes place and the stuffing box is rendered useless. Moreover it has been found that with stuffing boxes where gas tightness may be obtained when the parts are cold or the stuffing box is new, the stuffing box becomes rapidly inefficient as the temperature rises or after it has been in use for a short time, and it is the chief object of the preesnt invention to provide a construction of stuffing box in which gas tightness is assured under all conditions and in which the prevailing high temperatures will not influence its flexibility.

According to the present invention the stuffing box comprises a multiplicity of metal packing rings or the like dispersed around the inlet or outlet end of the stationary gas pipe or the like (hereinafter termed the gas pipe) through which the heating gases enter the revolving retort, together with flexible means, such as compressible spring buffers or their equivalent, for resiliently maintaining one of said packing rings in contact with the end of the retort or with a flanged member attached in a gas tight manner to the retort, in such manner that said packing rings are capable of rotary movement as well as a limited amount of sliding movement relative to the gas pipe. The flanged member may project from the end of the retort and be provided with a short cylindrical part which surrounds the extreme end of the gas pipe, and, located between said cylindrical member and the spring buffers or their equivalent on the gas pipe, are the metal packing rings which fit closely and in a gas tight manner around the gas pipe, said packing rings being as aforesaid capable of rotary movement and also of a limited amount of sliding movement relatively to the gas pipe, which movement is permitted and controlled by the aforesaid compressible spring buffers which hold said rings firmly but resiliently in position against the cylindrical member. Instead of being mounted directly upon the gas pipe, the spring buffers or their equivalent and the packing rings may be located upon a hollow sleeve which surrounds and is attached to the gas pipe and between which and the gas pipe a space is left for the circulation of a cooling medium such as gas or air. The packing ring which bears against the flanged cylindrical member may be of more massive construction than the other packing rings and may be of larger diameter than the gas pipe and said massive packing ring may be provided with an annular groove on one of its faces within which the end of the flanged cylindrical member projects, the said groove and the end of the flanged member being bevelled, rounded or otherwise shaped to allow of relative rotary movement between the said parts, while at the same time maintaining a gastight joint. The other packing rings, which are of slightly resilient character, are preferably mounted on a machined part of the gas pipe or of the aforesaid hollow sleeve which surrounds it, while the resilient buffers may be composed of a number of adjustable spring controlled yoke pieces or bifurcated members located around the gas pipe and carrying one or more rollers which bear against the packing rings, each yoke piece being preferably adapted to slide in a dovetailed or undercut groove provided in a boss on the gas pipe.

In order that the said invention may be clearly understood and readily carried into effect the same will now be described more fully with reference to the accompanying drawings, which show by way of example two constructional forms of the said invention and in which:—

Figure 1 is a longitudinal section of part of a revolving retort fitted with one form of flexible stuffing box constructed according to the present invention.

Figure 2 is a section on the line 2—2 of Figure 1.

Figure 3 is a plan view of one of the spring controlled yokes shown in Figure 1.

Figures 4 and 5 are a part sectional elevation and an end view respectively of a modified form of flexible stuffing box, Figure 4 being a part section on the line 4—4 of Figure 5 and the upper half of Figure 5 being a part section on the line 5—5 of Figure 4 and the lower half of Figure 5 being a part section on the line 5'—5' of Figure 4.

Figure 6 is a fragmentary detail view showing the parts of a packing ring resiliently connected.

$a$ is the end plate of a rotary retort, which in Figure 1 is shown applied to an unlined retort and in Figures 4 and 5 to a retort having a firebrick lining $a'$. Attached by bolts to the end plate $a$ is the flanged cylindrical member $b$ so that the end plate revolves with the retort and a gas tight joint is obtained between the member $b$ and the end plate $a$. $f$ is the stationary gas pipe which is unlined in Figure 1 and has a firebrick lining $f^2$ in Figures 4 and 5 and $e$ is the aforesaid massive packing ring which surrounds and is of larger diameter than the gas pipe $f$ so as to allow for circumferential expansion of the parts, the side which faces the cylindrical member $b$ being provided with a groove $d$ within which fits and works the bevelled and rounded extremity $c$ of the cylindrical member $b$. The gas pipe $f$ at a short distance from the end thereof is formed wth bosses $o$ which accommodate the stems $n$ of a number of bifurcated members or yoke pieces $k$ which form part of the resilient means for maintaining the massive packing ring $e$, and also the smaller packing rings $h^1$, $h^2$ pressed toward the flanged member $b$ on the end plate $a$. Within each of the bosses $o$ the shaft $n$ of the yoke piece $k$ is adapted to work and between each boss $o$ and a pair of adjusting nuts $p^1$, $p^2$, and also a washer $q$ mounted on a screw threaded portion $n^1$ of the stem $n$, a helical spring $m$ is located. Each yoke piece $k$, which is formed with bevelled edges $k^1$ as shown in Figures 2 and 5, carries a roller $j$ which bears against the packing ring $h^2$, (Figure 1) and the yoke piece $k$ is adapted to slide longitudinally within an undercut or dovetailed groove $l^1$ in a boss $l$ on the exterior of the gas pipe $f$. The gas pipe $f$ is provided with a raised machined portion $g$ on which the pair of packing rings $h^1$, $h^2$ are mounted, the said rings being located between the rollers $j$ and the said massive packing ring $e$. The packing rings $e$, $h^1$ and $h^2$ are made in halves (as shown) secured together and are of a slightly yieldable character. Preferably the packing rings are made in two parts resiliently held together by means of the bolt $y$ which extends through openings in the lugs $e''$ of the rings and has mounted between its end and the opposed faces of the lugs $e''$ a tensional spring $x$ as shown in Figure 6, the arrangement, however, being such that in any case they fit closely but yieldably around the machined portion $g$ of the gas pipe whilst at the same time being capable of slight longitudinal movement relatively to the part $g$ under the control of the spring $m$. $i$ (Figure 1) is a packing ring composed of slightly elastic material disposed between and kept in position by the packing rings $h^1$, $h^2$. In the slightly modified arrangement shown at Figures 4 and 5 the packing ring $i$ is dispensed with and an additional packing ring $h^3$ is provided which is attached at $h^4$ to the massive ring $e$. The massive ring $e$ has also a portion $e^1$ which surrounds the gas pipe $f$ beyond the machined portion $g$ thereof, and between the packing ring $h^2$ and the roller $j$ is an annulus $h^5$ substantially L-shaped in cross section. In this embodiment of the invention the parts of the stuffing box, instead of being mounted directly upon the gas pipe $f$ are mounted upon a hollow sleeve $f^1$ engaging at $f^3$ a flanged part of the gas pipe and provision is made (as shown) for circulating a cooling medium in any conventional manner, such as gas through the said hollow sleeve.

Any desired number of spring controlled yokes may be provided and disposed around the gas pipe.

Owing to the aforesaid arrangement, any longitudinal movement of the revolving end $a$ of the retort will be communicated through the packing rings $e$, $h^1$ and $h^2$ (Figure 1) or $e$, $h^1$, $h^2$, $h^3$, and $h^5$ (Figures 4 and 5) to the resiliently mounted roller $j$, the spring controlled yokes $k$ of which allow the packing rings to move longitudinally without interfering with the gas tightness of the joint. Should the end $a$ of the retort be moved relative to pipe $f$, the massive ring $e$ will slide transversely relative to the other packing rings without, however, interfering with the gas tightness of the joint. Furthermore any wobbling movement of the end $a$ of the retort relatively to the gas pipe $f$ will also be taken up without the gas tightness of the packing rings $h^1$, $h^2$ or $h^3$ being interfered with. Consequently, gas tightness is assured under all conditions and as the component parts of the stuffing box are made of a suitable heat resisting metal the prevailing high temperature will not influence the flexibility of the stuffing box or impair its gas tightness. According to the degree of tightness of the parts, the packing rings $e$, $h^1$, $h^2$ and $h^3$ will either rotate together with the revolving retort and the tubular member $b$, relatively to the resiliently mounted rollers $j$, or else they will remain stationary and the tubular member $b$ will revolve in the groove $d$ provided in the massive packing ring $e$, the relative movement of the parts being to some extent determined by the degree of expansion of the gas pipe $f$ in the retort.

It will be understood that the form of the invention herein set forth is merely illustrative and in no sense restrictive, and that such mechanical changes and modifications as fall within the purview of a mechanic may be made to the invention without departing from the spirit thereof or the scope of the appended claims.

What we claim and desire to secure by Letters Patent of the United States is:—

1. A gas tight stuffing box for the relatively moving parts of a rotary heating apparatus comprising a multiplicity of resilient packing rings surrounding one of said relatively moving parts and spring controlled members resiliently maintaining one of said resilient packing rings in contact with the other of said relatively movable parts in such manner that said resilient gland rings are capable of rotary movement and longitudinal sliding movement relative to the other of said relatively moving parts.

2. A gas tight stuffing box for the relatively moving parts of a rotary heating apparatus comprising a flanged cylindrical member connected to one of said relatively moving parts, resilient metal packing rings surrounding the other relatively movable part and spring controlled members resiliently maintaining one of said resilient metal packing rings in contact with said flanged cylindrical member in such manner that the resilient metal packing rings are capable of rotary movement as well as a limited amount of longitudinal sliding movement relatively to said flanged cylindrical member.

3. A rotary heating apparatus having in combination, a stationary pipe, a sleeve surrounding said pipe and spaced radially therefrom, a series of rings on said sleeve, a rotary retort, resilient means on said pipe and contacting with the outer of said rings for maintaining the inner of said rings in contact with said retort.

4. A rotary heating apparatus having in combination, a stationary pipe, a sleeve surrounding said pipe, a spaced compartment formed between said pipe and sleeve, resilient rings encircling said sleeve, a rotary retort associated with said pipe, spring controlled members resiliently maintaining said rings in contact with said retort, said rings being adapted to be moved rotatably and longitudinally relative to said pipe.

5. A rotary heating apparatus having in combination, a fixed pipe, a sleeve surrounding said pipe and spaced radially therefrom, a series of rings encircling said sleeve, a rotary retort, a plurality of longitudinally slidable members having recesses therein, rollers journalled in said recesses and engaging one of said rings, a stem secured at one end to each of said members and its opposite end journalled in a boss on said pipe, a compression spring surrounding each of said stems, and means on the ring adjacent said retort for locking the parts together.

6. A stuffing box for a rotary heating apparatus comprising, in combination with a fixed gas pipe, a flanged cylindrical member connected to said rotary heating apparatus, said flanged cylindrical member being of larger diameter than said gas pipe and surrounding one end of the same, a spaced compartment formed between said cylinder and said pipe, an annular member which bears against said flanged cylindrical member and which is of larger diameter than and surrounds the end of the gas pipe, flexible means for maintaining said annular member in contact with said flanged cylindrical member and other annular members acting as packing rings located between said annular member and said flexible means, said annular members fitting closely and in a gas tight manner around said gas pipe.

7. A gas tight stuffing box for the relatively moving parts of a rotary heating apparatus comprising a multiplicity of packing rings surrounding one of said relatively moving parts, a flanged cylindrical member connected to one of said relatively moving parts, said flanged cylindrical member surrounding and being of larger diameter than the other of said relatively moving parts, and a ring member which bears against said flanged cylindrical member and which is located between said flanged cylindrical member and said packing rings, said ring member being provided with an annular groove on one of its faces within which the end of the flanged cylindrical member projects for the purpose specified.

HARALD NIELSEN.
BRYAN LAING.